United States Patent [19]

Kosmatka

[11] Patent Number: 4,520,433

[45] Date of Patent: May 28, 1985

[54] MOTOR VEHICLE HEADLAMP

[75] Inventor: Walter J. Kosmatka, South Euclid, Ohio

[73] Assignee: General Electric Company, Schenectady, N.Y.

[21] Appl. No.: 646,031

[22] Filed: Aug. 30, 1984

Related U.S. Application Data

[63] Continuation of Ser. No. 386,498, Jun. 9, 1982, abandoned.

[51] Int. Cl.[3] ........................... F21V 7/00; B60Q 1/00

[52] U.S. Cl. .................................... 362/296; 362/346; 362/347; 362/349; 362/80

[58] Field of Search ............... 362/257, 296, 341, 346, 362/347, 349, 351, 80, 61

[56] References Cited

U.S. PATENT DOCUMENTS 1,359,789 11/1920 Brown ................................ 362/300
1,365,319 1/1921 Hazard ................................ 362/349
4,208,704 6/1980 Draper ................................ 362/350
4,276,583 6/1981 Fratty ................................ 362/346

FOREIGN PATENT DOCUMENTS 2280026 2/1976 France .
656948 10/1963 Italy ................................ 362/296

*Primary Examiner*—Ira S. Lazarus
*Attorney, Agent, or Firm*—J. F. McDevitt; Philip L. Schlamp; Fred Jacob

[57] ABSTRACT

A vehicle lamp, such as a headlamp or fog lamp, having a concave reflector truncated at its top and bottom, one of the truncated surfaces being closer to the optical axis than the other truncated surface, and both truncated surfaces being substantially non-reflective. This achieves significant glare control without requiring a separate shield between the light source and the reflector.

1 Claim, 3 Drawing Figures

MOTOR VEHICLE HEADLAMP

This application is a continuation of application Ser. No. 386,498, filed June 9, 1982, now abandoned.

BACKGROUND OF THE INVENTION

The invention is in the field of lamps for automobiles and other vehicles, such as headlamps and fog lamps, having truncated reflectors, i.e., reflectors having a concave surface which is truncated at the top and/or bottom.

Certain headlamp reflectors are truncated at their top and/or bottom to reduce their vertical height for better fitting and styling in automobiles. In these and other types of headlamps, a shield or other means is used to achieve sharp beam cutoff to reduce glare above the horizontal, specifically in low-beam lamps used for city driving. U.S. Pat. Nos. 1,359,789 to Brown and 4,276,583 to Fratty disclose truncated headlamps, in which Brown employs an auxiliary reflector and Fratty employs a shield to reduce glare. Attempts to design truncated headlamps having reduced glare, without the use of internal shields, have not been completely successful, especially where the filament is enclosed in a glass inner bulb.

SUMMARY OF THE INVENTION

Objects of the invention are to provide an improved and economical truncated vehicle lamp of compact size, without shielding the filament from the reflector, and which projects a light beam, when installed on a vehicle, that is substantially entirely below the horizontal thereby significantly reducing glare.

The invention comprises, briefly and in a preferred embodiment, a vehicle lamp having a generally parabolic or concave reflector which is truncated at its top, bottom or sides, thus providing one or more flat sections substantially parallel to the reflector's optical axis. The optical axis does not coincide with the center of the reflector. Furthermore, the flat surfaces are non-reflective, such as by being transparent or light-absorbing. This construction achieves the desired improvement in glare reduction and eliminates the need for prior art filament shield.

DESCRIPTION OF THE PREFERRED EMBODIMENTS

Figure 2:
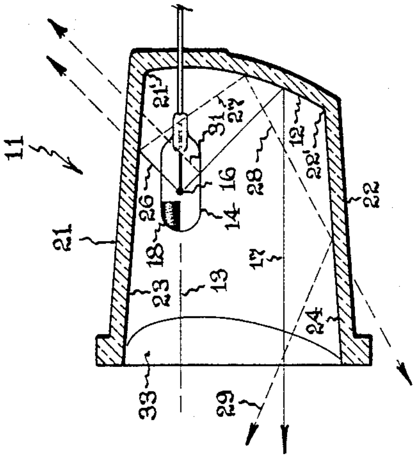
FIG. 2 is a side sectional view taken on the line 2—2 of FIG. 1.
Figure 1:
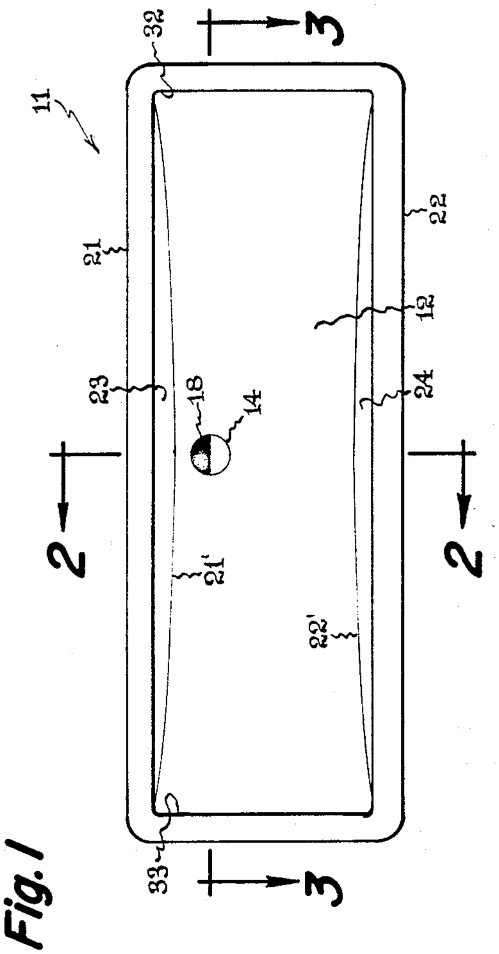
FIG. 1 is a front view of a headlamp in accordance with a preferred embodiment of the invention.
Figure 3:
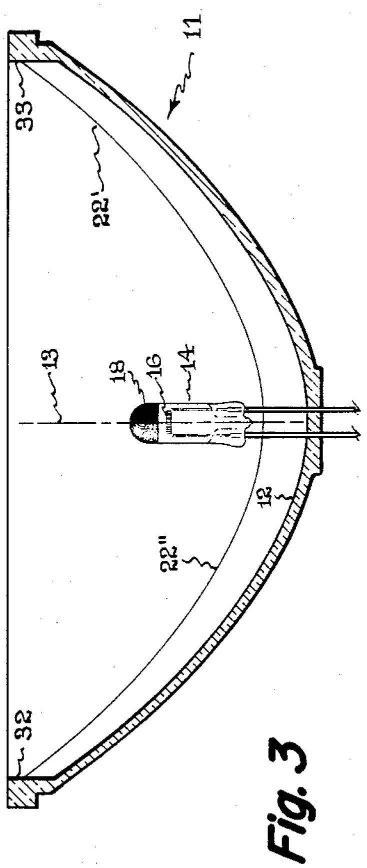
FIG. 3 is a horizontal sectional view taken on the line 3—3 of FIG. 1.

The headlamp comprises a reflector 11 having a generally parabolic or other concave reflecting surface 12 which may be a true parabola or a modified parabola configuration having an optical axis 13. A light bulb 14, preferably a halogen type, is held in the reflector 11 by conventional or other suitable means, and contains a filament 16 or other suitable light source at or near the optical axis 13 and also at or near the focal point of the reflector 12 so that the reflector 12 will reflect light from the light source 16 in a desired forward pattern as exemplified by the reflected light ray 17. If desired, the front top half of the bulb 14 may be rendered opaque, such as with a coating 18 of dark material, to block light rays that would emanate directly through the lens at an upward angle above the horizontal optical axis 13.

The top and bottom parts of the reflector 11 are truncated to form substantially flat top and bottom sections 21, 22 which may both be parallel to the optical axis 13. A transparent cover plate or lens can be attached over the front opening of the reflector in conventional manner. One of the flat sections, such as the top section 21, is considerably closer to the optical axis 13 than is the other flat section 22, whereby the reflecting surface 12 is approximately a half-section, or slightly wider, of the more conventional symmetrical parabolic reflector. This provides more accurate beam design control of the reflected beam pattern and achieves substantial reduction of undesirable glare light above horizontal by eliminating the conventional parabolic upper half reflecting surface which, if present, would cause some glare light having an upward directional component. The light source 16 should be frontwardly of the junction lines 21' and 22' of the flat sections 21, 22 and the parabolic section 12, at least in the vicinity 22" of the vertical plane in which the light source lies, to prevent glare rays caused by light reflected from inner surface areas of the bulb, frontwardly of the light source, and re-reflected by the parabolic reflector surface.

In accordance with the invention, one or both of the top and bottom reflector sections 21, 22 are made so as to be substantially non-reflective of light. This can be accomplished by making them transparent, or of a light-absorbing material, or coating them, preferably at their inner surfaces 23, 24, with a dark non-reflective material such as paint. The terms "non-reflective" and "substantially non-reflective" as used herein mean that a surface has a low reflectivity so as to reduce glare in accordance with the invention, it being recognized that it is difficult or impossible to achieve absolutely zero reflectivity at a surface.

As has been described, the parabolic reflecting surface 12 reflects light rays from the light source 16 in a desired frontwardly direction, and, if desired, can be contoured to reflect some light downwardly and frontwardly to illuminate the road near the vehicle, none of this reflected light having a deliberate upward component which can cause glare for oncoming motorists. Also, some light from the light source 16 will project directly frontwardly and downwardly through the front of the headlamp adding to the nearby road illumination but not causing glare. As has been stated, the opaque coating 18 on the front of the bulb blocks and prevents direct glare light rays. Some light rays 26 from the source 16 are at an upward and rearward angle, and are not reflected by the non-reflective surface 23 because it is absorbed by its dark color or because it passes through a transparent truncated section 21 and becomes trapped or absorbed by the vehicle hood or other structural members. If, however, the rays 26 were reflected at surface 23, they would follow a path 27, be re-reflected by surface 12 into a path 28, and again be re-reflected by surface 24 (if reflective) into a path 29 frontwardly and upwardly from the headlamp thus causing undesired glare to oncoming motorists. There would be an infinite number of such undesired glare rays, reflecting at diverging angles, i.e., "fanning out" and scattering from the surfaces 23 and 24 and causing a widespreading projected beam of light having an undesirable upward glare component. Also, light rays reaching the front region of the lower surface 24 directly from the source 16 would, if this surface were reflective, be reflected with a glare-producing upward component. The invention, by providing non-reflective characteristics at the truncated sections 21, 22, prevents or substantially reduces the glare light. Numeral 31 indicates a light ray reflected by the inner surface of the bulb 14 in an upward and rearward direction similar to the just-described ray 26, and which is not reflected by the truncated areas 21 and 22; if these areas were reflective, the ray 31 and others generally in the same direction would be multiply reflected and emerge as glare rays similar to ray 29.

The sides 32, 33 of the reflector can be truncated, if desired, to reduce the horizontal width, and may be either reflective or non-reflective because sideways (but not upward) reflected rays are relatively unimportant. Also, the light bulb 14, although shown horizontal, can be vertical or at another angle. With suitable redesign, the headlamp can be turned over so that area 22 is the top and area 21 is the bottom, the opaque coating area 18, if provided, being relocated on the bulb to block direct frontward light rays that would have an upward component through the front of the headlamp.

While preferred embodiments and modifications of the invention have been shown and described, various other embodiments and modifications thereof will become apparent to persons skilled in the art and will fall within the scope of the invention as defined in the following claims.

What is claimed is:

1. A vehicle headlamp for forward illumination substantially devoid of upwardly directed glare light, comprising a concave parabolic reflector member truncated at opposite side thereof to provide two generally flat top and bottom sections substantially parallel to each other and to the optical axis of a curved portion of the reflector member, and a light source contained within said reflector member, said light source being enclosed within a bulb and consisting of a single filament located adjacent the optical axis as well as the focal point of said reflector and further located frontwardly of the junction between said flat sections with said curved portion of the reflector member, said filament also being devoid of shield means blocking its light rays from being projected to the curved portion of the reflector member, both of said generally flat top and bottom sections being non-reflective and with said top section being substantially closer to said optical axis than said bottom section so as to substantially reduce the reflecting surface in said reflector member above said optical axis.

* * * * *